United States Patent
Greiciunas

(10) Patent No.: US 11,592,243 B2
(45) Date of Patent: Feb. 28, 2023

(54) HEAT EXCHANGER

(71) Applicant: BAE Systems plc, London (GB)

(72) Inventor: Evaldas Greiciunas, Leeds (GB)

(73) Assignee: BAE Systems plc, London (GB)

( * ) Notice: Subject to any disclaimer, the term of this patent is extended or adjusted under 35 U.S.C. 154(b) by 330 days.

(21) Appl. No.: 16/976,217

(22) PCT Filed: Mar. 8, 2019

(86) PCT No.: PCT/GB2019/050653
§ 371 (c)(1),
(2) Date: Aug. 27, 2020

(87) PCT Pub. No.: WO2019/171077
PCT Pub. Date: Sep. 12, 2019

(65) Prior Publication Data
US 2021/0003352 A1 Jan. 7, 2021

(30) Foreign Application Priority Data

Mar. 9, 2018 (EP) ..................................... 18160938
Mar. 9, 2018 (GB) ..................................... 1803776
Aug. 30, 2018 (GB) ..................................... 1814115

(51) Int. Cl.
*F28F 7/02* (2006.01)
(52) U.S. Cl.
CPC ..................................... *F28F 7/02* (2013.01)
(58) Field of Classification Search
CPC ..... F28F 7/02; F28F 3/086; F28F 3/12; F28D 9/0043; F28D 9/005; F28D 9/0056; F28D 9/0075

USPC ......................................................... 165/167
See application file for complete search history.

(56) References Cited

U.S. PATENT DOCUMENTS

| | | | |
|---|---|---|---|
| 9,777,973 B2 * | 10/2017 | Heusser | B01F 25/43161 |
| 10,422,585 B2 * | 9/2019 | Jensen | F28D 7/1615 |
| 2002/0084059 A1 | 7/2002 | Rittberger | |
| 2009/0101313 A1 * | 4/2009 | Hofmann | F28F 3/12 165/104.19 |
| 2009/0126911 A1 | 5/2009 | Shore et al. | |

(Continued)

FOREIGN PATENT DOCUMENTS

CA 101479032 A 7/2009
CN 104389683 A 3/2015

(Continued)

OTHER PUBLICATIONS

Search Report for Great Britain Patent Appl. No. 1803780.4, dated Aug. 13, 2018, 4 Pages.

(Continued)

*Primary Examiner* — Justin M Jonaitis
(74) *Attorney, Agent, or Firm* — Maine Cernota & Rardin

(57) ABSTRACT

There is disclosed a heat exchanger comprising a first channel, for communicating between a first channel inlet and a first channel outlet, a second channel for communicating between a second channel inlet and a second channel outlet, a third channel for communicating between a third channel inlet and a third channel outlet, a first conduit interconnecting the first channel and the third channel, and thereby defining a first group of interconnected channels, the first conduit extending through the second channel.

16 Claims, 5 Drawing Sheets

(56) References Cited

U.S. PATENT DOCUMENTS

| | | | |
|---|---|---|---|
| 2010/0139900 A1 | 6/2010 | Thompson | |
| 2015/0027669 A1* | 1/2015 | Kokas | F28F 3/12 165/104.26 |

FOREIGN PATENT DOCUMENTS

| | | | |
|---|---|---|---|
| EP | 1160530 A1 | | 5/2001 |
| EP | 1548387 A1 | | 6/2005 |
| EP | 3150952 A1 | | 4/2017 |
| GB | 1506721 | * | 3/1974 |
| GB | 1506721 A | | 4/1978 |
| JP | 2010270982 A | | 12/2010 |
| JP | 2017048961 A | | 3/2017 |
| WO | 2008139651 A1 | | 11/2008 |
| WO | 2011068470 A1 | | 6/2011 |

OTHER PUBLICATIONS

Office Action for U.S. Appl. No. 16/976,366 dated Oct. 29, 2021, 17 Pages.
International Preliminary Report on Patentability for PCT Patent Appl No. PCT/GB2019/050655, dated Sep. 15, 2020, 7 Pages.
International Preliminary Report on Patentability for PCT Patent Appl. No. PCT/GB2019/050654, dated Sep. 15, 2020, 7 Pages.
International Preliminary Report on Patentability for PCT Patent Appl No. PCT/GB2019/050653, dated Sep. 15, 2020, 7 Pages.
Search Report for Great Britain Patent Appl. No. 1814115.0, dated Feb. 15, 2019, 5 Pages.
International Search Report for PCT Patent Appl. No. PCT/GB2019/050655, dated May 15, 2019, 12 Pages.
International Search Report and Written Opinion for PCT Patent Appl. No. PCT/GB2019/050654, dated May 8, 2019, 11 Pages.
Search Report for Great Britain Patent Appl. No. 1803780.4, dated Aug. 10, 2020, 4 Pages.
Search Report for European Patent Appl. No. 18160944.7, dated Jul. 18, 2018, 6 Pages.
International Search Report and Written Opinion for Patent Appl. No. PCT/GB2019/050654, dated May 8, 2019, 8 Pages.
Search Report for Great Britain Patent Appl. No. 1803776.2, dated Aug. 10, 2018, 4 Pages.
European Search Report for Patent Appl. No. 18160938.9, dated Aug. 6, 2018, 6 Pages.
International Search Report and Written Opinion for Patent Appl. No. PCT/GB2019/050653, dated May 6, 2019, 7 Pages.
Notice of Allowance for U.S. Appl. No. 16/976,366 dated Dec. 8, 2021, 5 Pages.
Office Action for U.S. Appl. No. 16/976,309 dated Oct. 19, 2022, 29 pages.
Search Report by Registered Search Organization for Patent Appl. No JP2020570653 dated Oct. 13, 2021, 17 pages.
Notice of Reasons for Refusal for Patent Appl. No. JP2020570653 dated Oct. 13, 2021, 13 pages.
European Office Action for Patent Appl. No. EP19709556.5 dated Dec. 7, 2021, 5 pages.
Examination Report for Patent Appl. No. GB1803776.2 dated Jan. 13, 2022, 2 pages.
Examination Report for Patent Appl. No. GB1803780.4 dated Jan. 13, 2022, 1 page.
European Office Action for Patent Appl. No. EP19709557.3 dated Feb. 3, 2022, 5 pages.
European Office Action for Patent Appl. No. EP19711687.4 dated Feb. 7, 2022, 5 pages.
Examination Report for Patent Appl. No. GB1814115.0 dated Feb. 10, 2022, 3 pages.
Examination Report for Patent Appl. No. GB1814115.0 dated May 30, 2022, 1 page.

* cited by examiner

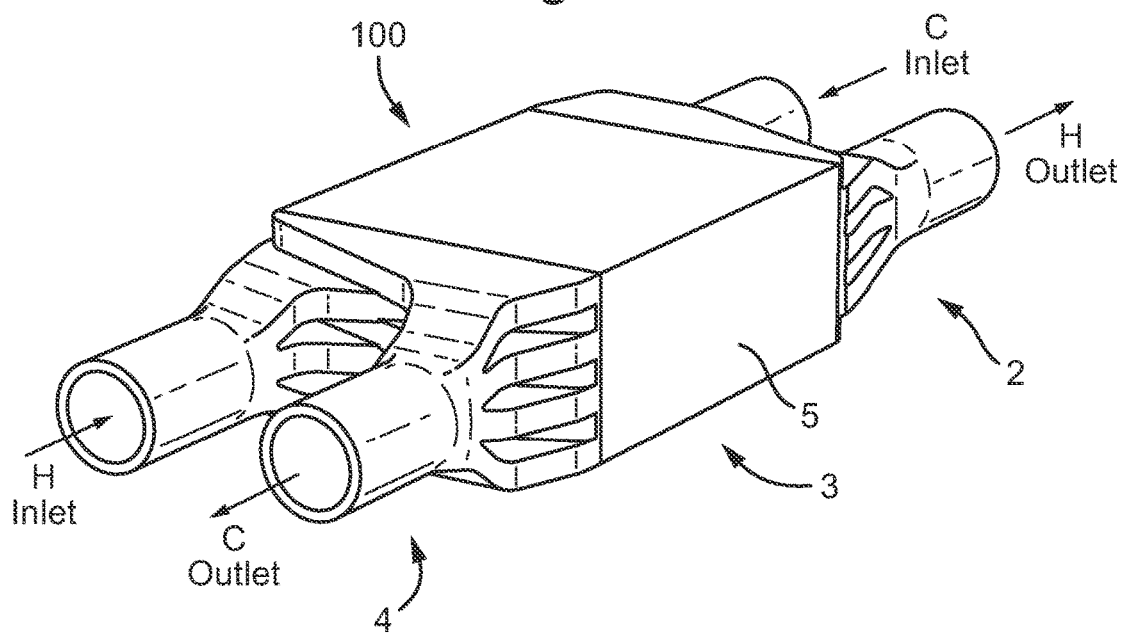
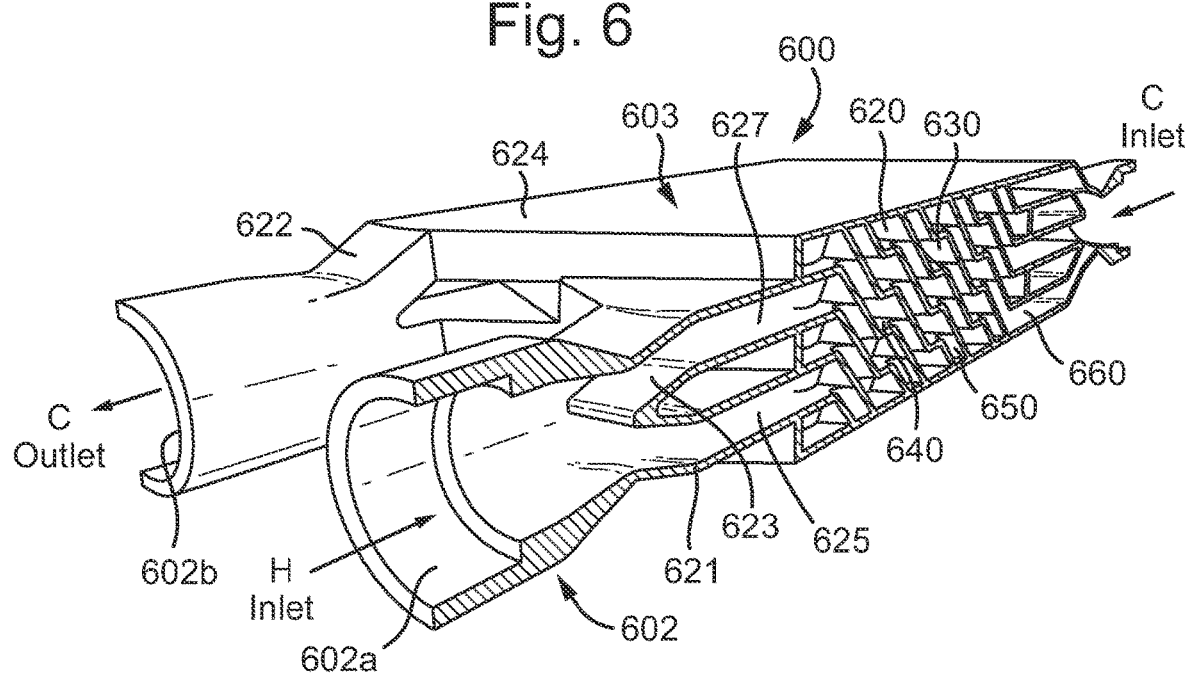

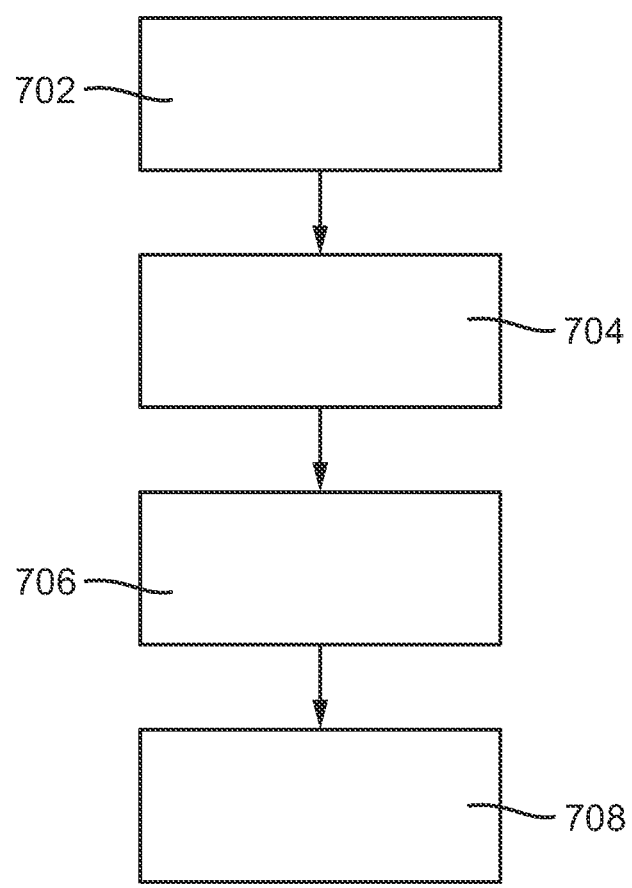

HEAT EXCHANGER

RELATED APPLICATIONS

This application is a national phase application filed under 35 USC § 371 of PCT Application No. PCT/GB2019/050653 with an International filing date of Mar. 8, 2019, which claims priority of GB Patent Application 1803776.2 filed on Mar. 9, 2018, EP Patent Application 18160938.9 filed on Mar. 9, 2018, and GB Patent Application 1814115.0 filed on Aug. 30, 2018. Each of these applications is herein incorporated by reference in its entirety for all purposes.

FIELD

According to the present invention there is provided a heat exchanger.

BACKGROUND

It is known, for example from WO2014/135844 (BAE Systems plc), to provide a heat exchanger with a plurality of channels for a working fluid, these channels being interleaved amongst a plurality of channels for coolant fluid.

It is also known to introduce baffles into channels to affect flow and heat transfer. Baffles can improve the heat transfer efficiency of a heat exchanger, but can tend to raise the pressure drop across the exchanger.

SUMMARY

According to a first aspect of the invention there is provides a heat exchanger comprising: a first channel, for communicating between a first channel inlet and a first channel outlet, a second channel for communicating between a second channel inlet and a second channel outlet, a third channel for communicating between a third channel inlet and a third channel outlet, a first conduit interconnecting the first channel and the third channel, and thereby defining a first group of interconnected channels, the first conduit extending through the second channel.

The provision of a conduit extending through the second channel presents a further surface area which may be exploited for heat transfer, whilst encouraging inter channel mixing. This can tend to increase the heat transfer efficiency between fluids in the heat exchanger.

There may be provided a plurality of first conduits interconnecting the first channel and the third channel, the plurality of first conduits extending through the second channel.

As such the surface areas and inter-channel mixing can tend to be further increased.

The first conduit may have an elongate cross sectional form. The elongate cross-sectional form may define a shorter aspect S and a longer aspect L wherein the longer aspect is substantially aligned with the predetermined flow direction. Alternatively or additionally, the longer aspect may be substantially aligned with the incline of the first conduit (for example aligned with the plane defined by the conduit and the channel axes).

The plurality of first conduits may be spaced apart at regular intervals.

As such an even mixing between channels may be achievable.

The plurality of first conduits are arranged in adjacent pairs where one conduit per pair is arranged to promote inter-channel flow from the third channel to the first channel, and the other conduit per pair is arranged to promote inter-channel flow from the first channel to the third channel.

Such pairing of conduits enables the provision of a repeating unit which can be used to build up a heat exchanger core. It also helps to provide a functionally flexible core where each channel group is suitable for flow in either direction and the core is deployable in either counter flow or co-flow configurations.

The heat exchanger may further comprise a fourth channel, for communicating between a fourth channel inlet and a fourth channel outlet, a second conduit interconnecting the second channel and the fourth channel and thereby defining a second group of interconnected channels, the second conduit extending through the third channel. Further, such a heat exchanger may further comprise a plurality of second conduits interconnecting the second channel and the fourth channel, each of the second conduits extending through the third channel. Still further, such a heat exchanger may provide a plurality of second conduits arranged in adjacent pairs where one conduit per pair is arranged to promote inter-channel flow from the fourth channel to the second, and the other conduit per pair is arranged to promote inter-channel flow from the second channel to the fourth.

Such a provision can tend to further promote even mixing of fluids between channels, and thereby improve the efficiency of the heat exchanger. Such improved mixing can in turn be associated with an increase in heat transfer.

Where first and second conduit pairs are provided, the first conduit pairs and the second conduit pairs occupy an equivalent position in the second and third channel respectively.

As such a more regular structure can be provided which can tend to apply more consistent mixing and transfer.

In some examples, the first conduit is, or the plurality of first conduits are, inclined relative to a central axis defined by the first channel and thereby arranged to promote inter-channel flow.

In heat exchangers provided with a second conduit or a plurality of second conduits, the second conduit or the plurality of second conduits can be inclined relative to a central axis defined by the second channel.

Such conduit inclination can bias certain flows and thereby can tend to mitigate the increases in pressure drop across the exchanger which could otherwise be encountered from the conduits.

The heat exchanger may comprise a top plate and plurality of base plates mounted between a pair of side walls, wherein the first channel is defined between the top plate, a first base plate and a portion of the side walls, the second channel is defined between the first base plate, the second base plate and a portion of the side walls, the third channel is defined between the second base plate, the third base plate and a portion of the side walls, and The fourth channel is defined between the third base plate, a fourth base plate and a portion of the side walls.

The first and third channels, being in fluid communication, may be arranged to transport a first fluid in a first flow direction, and the second and fourth channels, being in fluid communication are arranged to transport a second fluid in a second flow direction. The first and second flow directions can be generally opposite to provide a counter-flow heat exchanger.

As such a counter-flow arrangement be provided, tending to provide efficient cooling.

The heat exchanger may further comprise towards a first end: a first fluid ingress manifold connecting the inlets of the first and third channels to a common first fluid inlet port, a second fluid ingress manifold connecting the outlets of the second and fourth channels to a common second fluid outlet port; and towards a second end: a first fluid egress manifold connecting the outlets of the first and third channels to a common first fluid outlet port, a second fluid egress manifold connecting the inlets of the second and fourth channels to a common second fluid outlet port.

According to a second aspect of the invention there is provided a method of heat exchange comprising providing a heat exchanger according to the first aspect, causing a coolant fluid to flow through the first and second channel, causing a working fluid to flow through the third channel.

BRIEF DESCRIPTION OF THE DRAWINGS

So that the invention may be well understood, exemplary embodiments are herein described with reference to the following figures, of which:

FIG. 5 shows a three-dimensional representation of a first example heat exchanger;

FIG. 6 shows a three-dimensional representation of a second heat exchanger;

FIG. 7 shows a flow diagram for arranging a heat exchanger; and

DETAILED DESCRIPTION

It will be appreciated that relative terms such as horizontal and vertical, top and bottom, above and below, left and right, front/fore and back/aft, near and far, and so on, are used below merely for ease of reference to the Figures, and these terms are not limiting as such, and any two differing directions or positions and so on may be implemented rather than truly horizontal and vertical, top and bottom, and so on.

Figure 1:
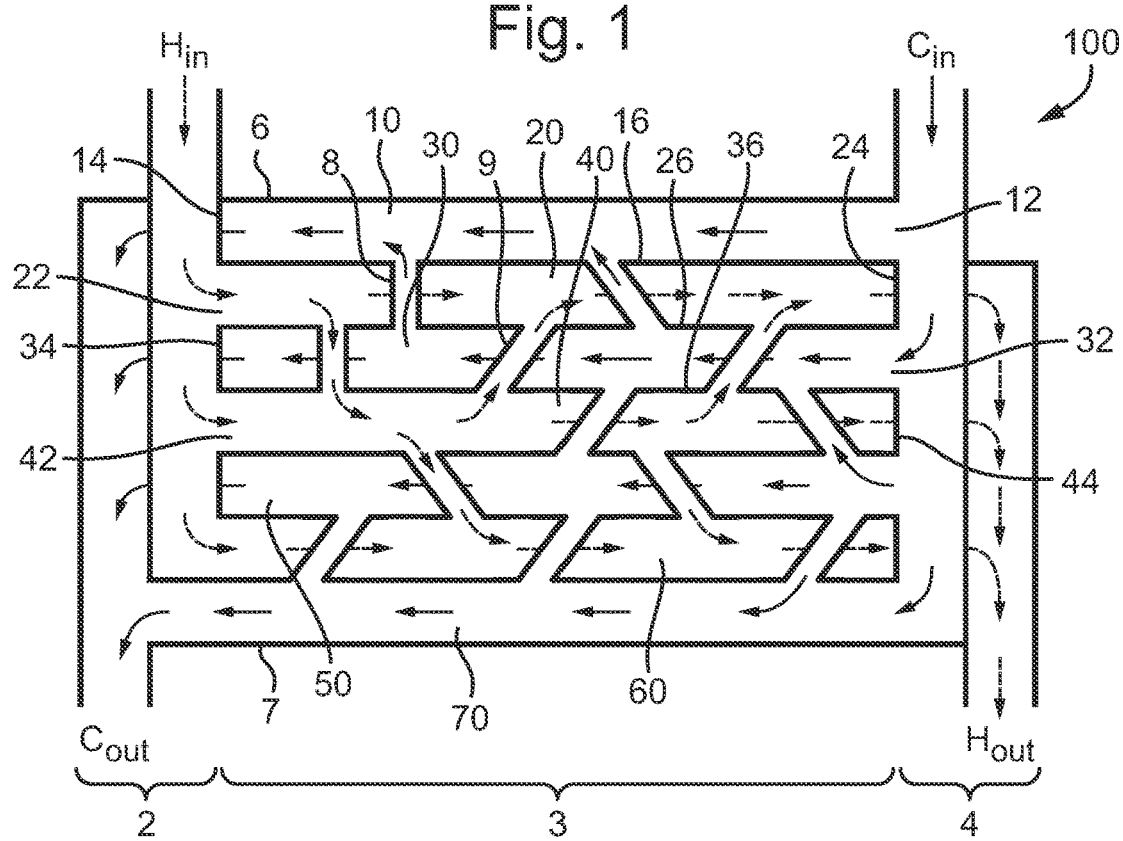
FIG. 1 shows a schematic cross-section of a first example heat exchanger.

With reference to FIGS. 1 and 5, a first heat exchanger is shown generally at 100 which comprises a first manifold 2, a core 3, and a second manifold 4.

The heat exchanger 100 is arranged for counter-flow where a first fluid, hot fluid H (which may alternatively be referred to as a working fluid), passes in the opposite direction to a second fluid, cold fluid C (which may alternatively be referred to as a coolant fluid). As shown in FIG. 1, the hot fluid H passes through the core from right-to-left, whilst the cold fluid C passes through the core left-to-right.

In alternative heat exchangers contemplated, the hot fluid H and the cold fluid C could be arranged for co-flow (where the fluids run in the same direction, e.g. both right-to-left) or cross-flow (where fluids run perpendicular to each other).

The core 3 comprises a plurality of channels. These channels are configured as two groups, the first group for transporting the first fluid, the second group for transporting the second fluid. Channels alternate by group so that an interleaved arrangement is provided, with channels separated by base plates. A multi-layer stack is thus provided. The first group of channels, corresponding with the odd-numbered channels pass fluid in a first direction. The second group of channels, corresponding with the even-numbered channels, pass the fluid in a second direction.

In particular, a first channel 10 is defined between a top plate 6 and a first base plate 16, and extends between a pair of first channel ports. These ports are configured for a right-to-left (as shown in FIG. 1) flow direction and as such represent a first inlet 12 communicating with the second manifold 4 and a first outlet 14 communicating with the first manifold 2.

A second channel 20 is defined between the first base plate 16 and a second base plate 26, and extends between a pair of second channel ports. These ports are configured for a left-to-right (as shown in FIG. 1) flow direction and as such represent a second inlet 22 communicating with the first manifold 2 and a second outlet 24 communicating with the second manifold 4.

A third channel 30 is defined between the second base plate 26 and a third base plate 36, and extends between a pair of third channel ports. These ports are configured for a right-to-left (as shown in FIG. 1) flow direction and as such represent a third inlet 32 communicating with the second manifold 4 and a third outlet 34 communicating with the first manifold 2.

A fourth channel 40 is defined between the third base plate 36 and the fourth base plate 46, and extends between a pair of fourth channel ports. These ports are configured for to a left-to-right (as shown in FIG. 1) flow direction and as such represent a fourth inlet 42 communicating with the first manifold 2 and a fourth outlet 44 communicating with the second manifold 4.

Further, there is equivalently provided: a fifth, sixth and seventh channel (50, 60 and 70 respectively); a fifth and sixth base plate (not numbered so as to reduce visual clutter in the figure), and a bottom plate 7, and their respective inlets and outlets (not numbered).

With additional reference to FIG. 5, the channels are further defined by side walls 5.

Thus a first group of channels, the odd channels, comprises the first, third, fourth, fifth and seventh channels. These odd channels can pass a common fluid in a common direction, in this example they pass hot fluid H right to left. In other examples they could pass fluid left to right.

A second group of channels, the even channels, comprises the second, fourth and sixth channels. These even channels can pass a common fluid in a common direction, in this example they pass a cold fluid C from left to right. In other examples they could pass fluid right to left.

Thus in the core 3 there are four channels in the first group and three channels in the second group. Providing an unequal number of channels in an interleaved stack tends to result in channels from a particular group being at the outermost (top and bottom) layers of the stack. In the core 3, channels 10 and 70 provide such outermost layers. In the FIG. 1 configuration, by passing hot fluid through the first group, hot fluid channels pass through these peripheral layers.

In alternatively configured cores, such as shown in FIGS. 5 and 6, the cold fluid may be passed through a first group of channels providing the peripheral layers of the stack, whilst the hot fluid is passed through a second group of channels interleaved with the first group. Such alternative arrangements can tend to less heat being lost to the surroundings, tending to raise the efficiency of the exchanger.

In addition to the channels, the core 3 comprises a plurality of conduits (spur conduits) which split off their main channel and interconnect with other channels from the same group. (These interconnecting conduits 8 can be considered to be a spur off of a channel in so far as it offers an alternative flow path to the fluid, but does Is not associated with an occlusion or termination of their main channel).

As such, a plurality of first conduits 8 provides inter-channel connections between odd-numbered channels. As such a fluid can flow between the interconnected channels. Each conduit 8 extends through an even channel but does not fully occlude that even channel.

For example, a plurality of conduits 8 are provided, each of which interconnects the first channel 10 and the third channel 30, passing through the second channel 20.

Some conduits 8 are substantially perpendicular to the channels. Some conduits are inclined to the channels.

In the first example, the odd conduits extend only between neighbouring odd channels; however in alternative examples, some odd conduits could extend between other odd channel combinations. For example, an odd conduit could connect a first channel 10 and a fifth channel 50, passing through the second 20, third 30, and fourth 40 channels.

A plurality of second conduits 9 provides inter-channel connections between even-numbered channels. As such a fluid can flow between the interconnected channels. Each of the second conduits 9 extends through at least one odd channel but does not fully occlude it or them.

The first manifold 2 comprises, given the counter-flow configuration, an odd channel egress manifold collocated with an even channel ingress manifold. The odd channel egress manifold connects, by way of a branched chamber, the odd outlets from the core to a common odd outlet $C_{out}$. The even channel ingress manifold connects, by way of a branched chamber, the even inlets to the core to a common even inlet, $H_{in}$. As such, a first fluid can pass from the odd channels to the common odd outlet. As such a second fluid can pass from the common even inlet to the even channels.

The second manifold 4 comprises, in reciprocity with the first manifold 2, an even channel egress manifold collocated with an odd channel ingress manifold. The even channel egress manifold connects, by way of a branched chamber, the even outlets from the core to a common even outlet. The odd channel ingress manifold connects, by way of a branched chamber, the odd inlets to the core to a common odd inlet $C_{in}$. As such, a first fluid can pass from the even channels to the common even outlet $H_{out}$. As such a second fluid can be transported from the common odd inlet $C_{in}$ to the odd channels.

Figure 2:
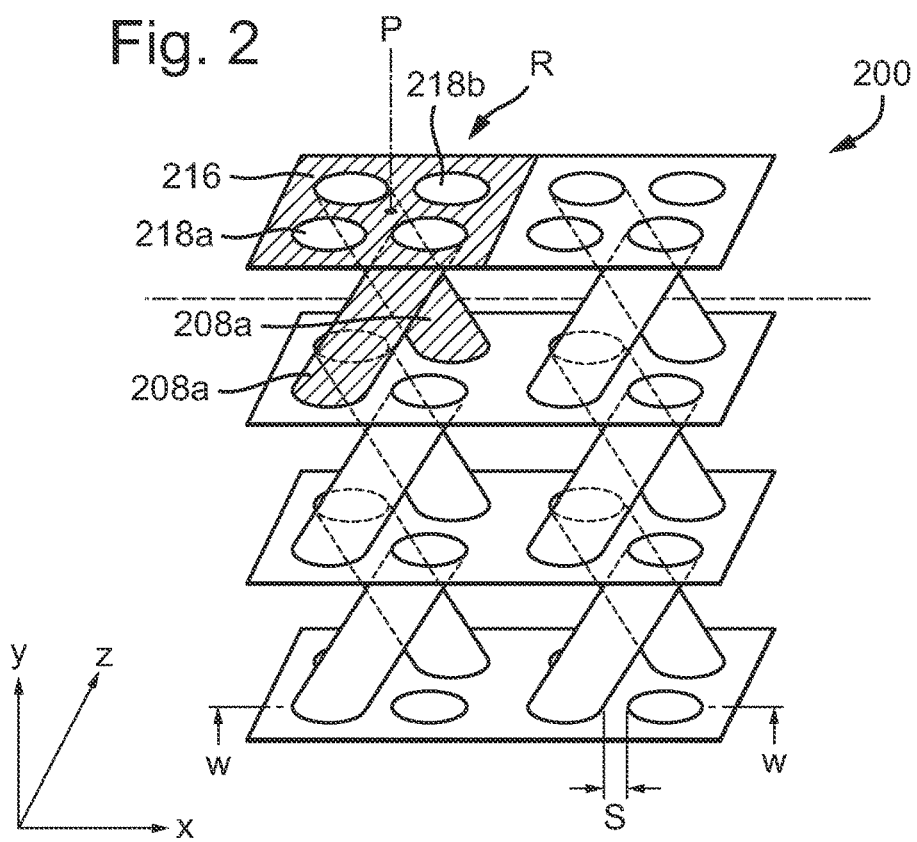
FIG. 2 shows a three-dimensional representation of a first example portion of a heat exchanger core.

With reference to FIG. 2, there is shown a three-dimensional portion 200 of a heat exchanger core which could be used in the heat exchanger 100. The portion 200 is shown in the context of three mutually orthogonal reference axes, x, y, and z. As shown on the page, the y-dimension corresponds to height (up/down), the x-dimension corresponds to width (fore/aft, or alternatively right/left) and the z-dimension corresponds to depth (near/far).

The portion 200 corresponds to a portion of the third, fourth and fifth channels of the core 3.

The portion 200 is comprised by a set of repeating units R (shown as the shaded components in the top left of FIG. 2).

A repeating unit R comprises a base plate section 216 which has a rectangular planar form, which is parallel with the zx plane.

Formed in the base plate section 216 is a pair of openings 218a and 218b and a pair of linear conduits 208a, 208b. The openings and conduits are arranged such that their footprints in the plate 216 define a rectangle, with conduit footprints positioned diagonally opposite on another.

The conduits 208a and b extend in or parallel to the yx plane out from the plate 216 and are inclined to the plate 216 by approximately 45 degrees. More particularly the near conduit 208a extends from a foremost and nearmost footprint in a backwards direction (−45 degrees), and the far conduit 208b extends from an aftwards and farmost footprint in a forwards direction (+45 degrees).

As such, given that the base plate 216 defines an axis P which extends perpendicularly through the centroid of the plate 216, the openings 218a 218b and the conduits 208a 280b are arranged such that they exhibit rotational symmetry, order 2, about the base plate axis P.

The extension of the conduits is such that the near conduit 208a meets the near opening of the plate 226 below, whilst the far conduit meets the far opening of the plate 226 below.

Whilst only a section 200 of a core 3 has been described, it will be appreciated that any size of core 3 could be populated with repeating units R by forming multiple repeating units in the x, y, and z directions. In effect this would form a number of continuous base plates interconnected by a plurality of conduit pairs.

With all conduits of the portion 200 extending parallel to the same plane, the yx plane, such cores would be suitable for co-flow and counter-flow arrangements.

Figure 3:
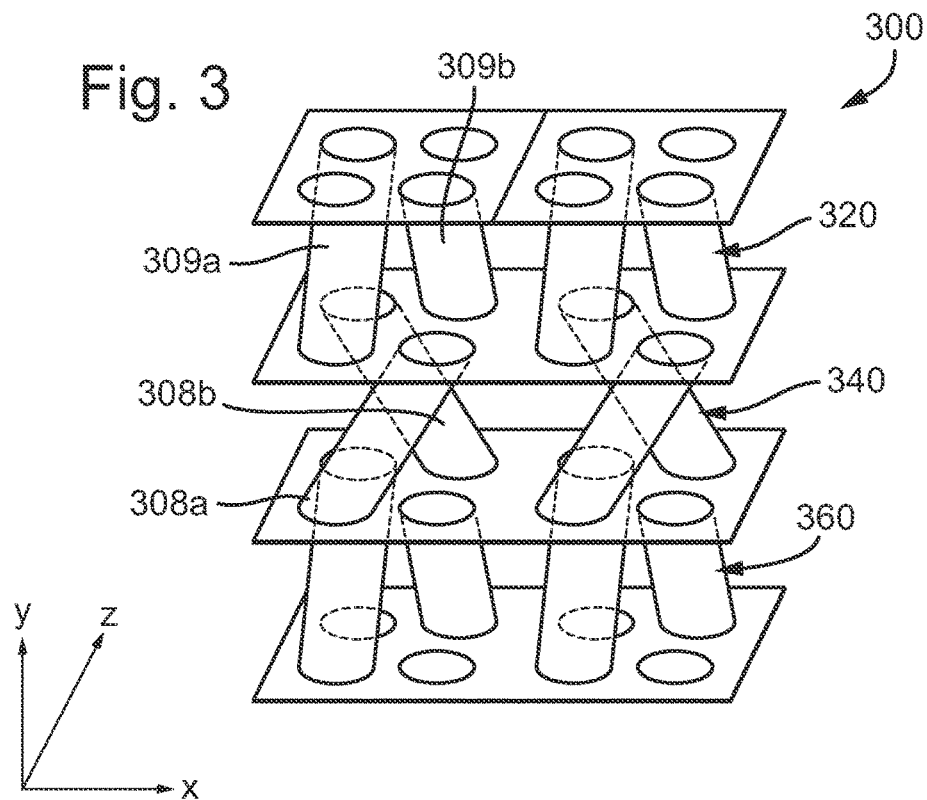
FIG. 3 shows a three-dimensional representation of a second example portion of a heat exchanger core.

With reference to FIG. 3, there is shown a portion 300 for a heat exchanger core which would be suitable for a cross-flow arrangement.

The portion 300 shown comprises three channels 320, 340 and 360 interleaved in that order. The channels 320 and 360 are for passing a first fluid, H, in the x-direction (that is to say from aft to fore) and the channel 340 is for transporting a second fluid, C, in the z-direction (i.e. from near to far).

Each of a plurality of conduits 308 extends between the H channels 320 and 360, and through the C channel 340, in or parallel to the yx plane. Thus the channels 320 and 360 are in fluid communication.

Each of a plurality of conduits 309 extends between the C channel 340 and the next upwards C channel, passing through the H channel 320, in or parallel to the yz plane.

The portion 300 for the heat exchanger core can be seen as a combination of the repeating unit R discussed in connection with portion 200 and FIG. 2, with a further repeating unit. As shown in FIG. 3, two R-type units are present in one layer, and these are sandwiched between further layers, each further layer having two further repeating units. As such the R-type layers alternate with further-type layers.

Each further repeating unit is the mirror image of the unit R, reflected in an yz plane, and rotated by 90 degrees, about its plate axis P.

Figure 4:
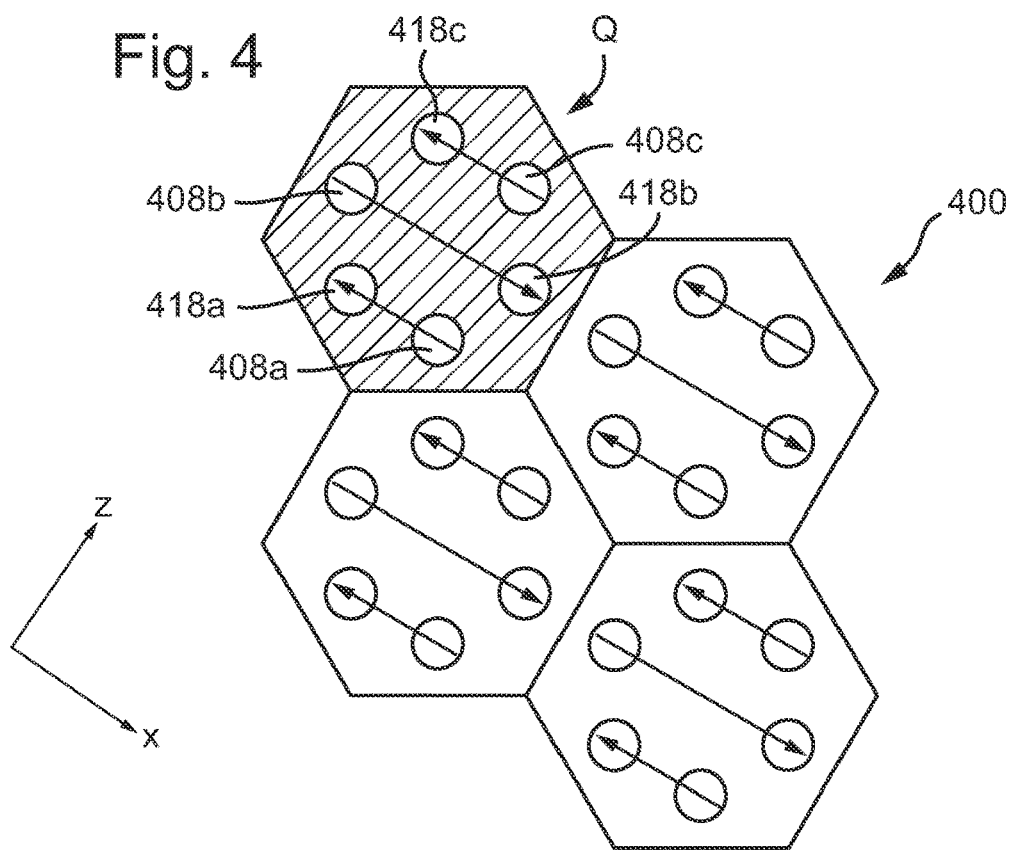
FIG. 4 shows a schematic layout of a fourth example portion of a heat exchanger core.

With reference to FIG. 4, there is a shown schematically a further example of a portion, indicated generally at 400, of a heat exchanger core.

The portion 400 is comprised from a number of repeating units Q, each of which, as with repeating units R, tessellates with other repeating units. The units Q comprise a hexagonal base plate 416, in which is provided six regularly spaced footprints, arranged symmetrical about the axis defined by the plate 416. Three of the footprints correspond with openings 418a-c, three of the footprints correspond with conduits 408a-c which extend upwardly from the base plate in the yx plane. Two of the conduits, the nearest 408a and farthest 408c extend aftwards. The other conduit, middle/aftmost conduit 408b, extends forwards.

FIG. 6 shows a monolithic multi-channel heat exchanger 600 where three first fluid channels 620, 640 and 660 are interleaved with 2 second fluid channels 630 and 650. A first integrated manifold 602 communicates with the channels at a first side of the exchanger 600. A second integrated manifold 604 communicates with the channels at a second side of the exchanger 600.

The first manifold 602 comprises a first common port 602a for working fluid H and a second common port 602b for coolant C.

The first common port 602a is generally cylindrical and communicates with a chamber leading to three onward branches (one of which 622 is visible) each of which meets a respective taper section (624) which tapers out to meet a respective channel (620).

The second common port 602b is generally cylindrical and communicates with a chamber leading to two onward branches 621, 623 each of which meets a respective taper section 625, 627 which tapers out to meet a respective channel 630, 650.

For illustrative purposes, heat exchanger 600 is shown in cut-away, at a point in the core equivalent to the cross section WW shown in FIG. 2.

In the heat exchanger 600, for a given plate, the separation between each opening and the outer diameter of the relevant neighbouring conduit is negligible. In other words and with respect to FIG. 2, the separation S is zero. Such a provision tends to promote smooth flow from the channel into the conduit.

For either the heat exchanger 100 or 600, in operation, a first, or cold fluid C, is put under pressure and thereby caused to flow into the common cold fluid inlet of first manifold, then through the first manifold, then into and through the even channels and then into the second manifold, and then out of the second manifold at the common cold outlet.

Whilst flowing through the first manifold, the cold fluid splits into separate flows, each one associated with a particular even channel. As the fluid flows through a given even channel, it may be further diverted by the conduits 9, which bleed off some of the fluid into neighbouring even channels. Meanwhile, some of the fluid flowing through neighbouring even channels will be bled off into the given even channel.

Whilst flowing within the given even channel, the fluid will flow around the odd conduits 8 which extend through the given channel.

An equivalent flow occurs as the second, or hot fluid, is introduced to heat exchanger at the second manifold, whereupon it flows into and through the odd channels, and into first manifold where it leaves the heat exchanger.

No mixing of the first and second fluids is permitted.

The base plates and conduits are formed from a thermally conductive material. Thus there is provided a surface area at the boundaries between hot and cold fluids which enable the transfer of thermal energy from the hot fluid to the cold fluid.

The inclination of the conduits 9, 8 promotes bleeding off and inter-channel fluid mixing. In particular, the conduits that extend from a given channel in the opposite general direction to the flow (e.g. at −45 degrees), will tend to bleed fluid into the given channel from neighbouring same-fluid channels. Further, conduits extending from a given channel in the same general direction to the flow (e.g. at +45 degrees) will tend to bleed fluid out of the given channel into neighbouring same-fluid channels.

The interconnecting conduits 8 and 9 are generally inclined at 45 degrees and as such are biased to promote the inter-channel flow. Such an angle can be achieved using an additive layer manufacturing process, providing a sufficiently robust structure without requiring supports or buttressing. In alternative examples, a range of angles may be suitable for this inclination. For example inclinations in the range of 30 to 60 degrees or 40 to 50 degrees may be suitable, with additional supporting structures provided as appropriate.

In other alternative examples of the heat exchanger, the conduits could extend perpendicularly from the base plate and thereby achieve or promote inter-channel fluid mixing; such an arrangement may lead to a greater pressure drop across the core as compared with the inclined conduits.

Alternatively, conduits could be fitted with a one-way valve to promote certain flow characteristics.

Each of the interconnecting conduits defines an inner cross section (bore) and outer cross section (outer wall), which will have the same form if the wall-thickness is constant.

The outer wall of an interconnecting conduit may have a number of different forms. For example the outer wall may be of a circular cross section as shown in FIGS. 2, 3, and 4 for example.

Figure 8A:
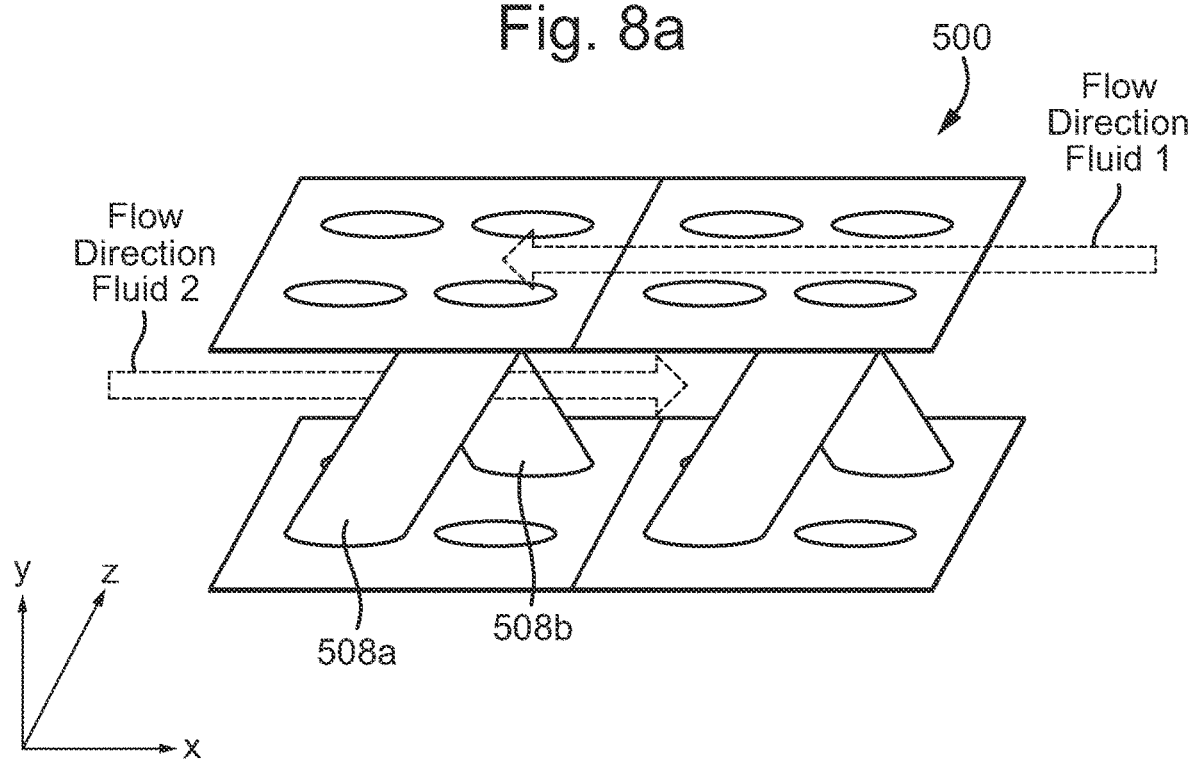
FIGS. 8a and 8b show an alternative configuration of the first example of the heat exchanger.
Figure 8B:
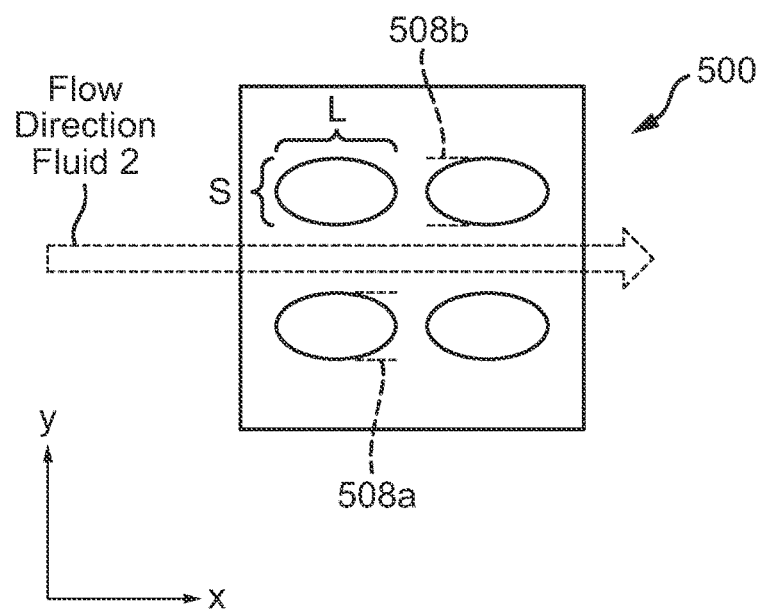

Alternatively the conduit may have an elongate cross-sectional form with a shorter aspect axis S and a longer aspect axis L as shown in the heat exchanger 500 of FIGS. 8a and 8b.

Elongate form outer walls applicable to the present heat exchangers would include elliptical, ovoid, rectangular, rhomboid, rhombus, trapezoid or kite cross-sections.

Elongate form outer walls applicable would include those with aspect ratios ranging from 4:1 to 1:1, but more preferably 2.5:1 to 1.5:1.

In certain embodiments, elongate form outer walls are aligned so that the longer aspect of their outer wall is aligned with the predetermined direction of the flow (or at least the expected direction of the flow). This is shown in FIG. 8b where the long axis of the ellipse (shown as a dot dash dot line) is parallel with the flow direction.

Where the conduits are inclined, the longer aspect of the outer wall can be aligned with the plane in which the conduit is inclined (referring to FIG. 8b, see how the long axis of the ellipse is parallel with the walls out the conduit 508a and 508b). Often the conduits will be configured to be inclined in alignment with the predetermined flow direction, and as such this arrangement tends to help guide flowing fluid into the conduit and thereby promote inter-channel mixing. Further, the alignment of incline and longer aspect of outer wall tends to provide a structure that is better arranged to facilitate additive layer manufacturing techniques, as it can better support an overhanging structure (thereby obviating at least to some degree the need for supporting structures such as buttresses).

Further, where the elongate bore is of the form that tapers (e.g. ellipsoidal, ovoid, rhomboid, rhombic, etc) there tends to be a beneficial flow characteristic because there is presented a smaller frontal area to the other fluid flow as it extends between the channels it connects. This tends to lead to a lower pressure drop in the other fluid channel.

For cross-flow heat exchanger examples, it may not be straightforward to collocate the first fluid ingress manifold and the second fluid egress manifold (and vice versa) at a single integrated manifold 2 (or 4). Thus in cross-flow configurations, there could be four separate manifolds.

The heat exchangers provided for can be formed from a heat-conducting material having the structural integrity to retain complex forms. Metals for example would be suitable.

The heat exchangers provided for can be manufactured using additive layer manufacturing techniques (also known as additive manufacturing, or 3D printing). For example, a selective laser melting (SLM) process may be used to form the heat exchanger. SLM uses a high power-density laser to melt and fuse metallic powders together.

Thus, in accord with these properties, the heat exchanger may be formed from any of a number of suitable materials which would be apparent to the skilled person, including but not limited to an Inconel alloy, titanium or an alloy thereof, aluminium or an alloy thereof, or a stainless steel.

With reference to FIG. 7, a method of forming a heat exchanger structure is shown as involving a first step 702 of defining a repeating unit, a second step 704 of defining an operational characteristic set for a heat exchanger structure, a third step 706 of determining the parameters of the repeating units which satisfy the operational characteristic set, and at a fourth step 708, forming the structure according to the parameters.

At step 702, defining the repeating unit includes providing the definition of the repeating unit R having a set of variable parameters including but not limited to: base plate size, base plate thickness, base plate shape, conduit upward extension (i.e. channel height), opening/conduit bore, conduit wall thickness, conduit inclination, footprint location, and in-channel orientation (i.e. which plane the conduits align with for a channel, determining counter flow or co flow).

At step 704, the operational characteristic set may define a number of constraints including but not limited to: a desired thermal transfer rate, a working fluid combination (e.g. air and air, oil and fuel, air and glycol), a given space into which the exchanger should fit, a channel height, and an allowable pressure drop across the heat exchanger.

At step 706, the determination of the parameters of the unit R could be carried out, in light of the operational characteristics from step 704, using a number of fluid dynamic simulations of the heat exchanger. These simulations could be carried out iteratively, for example in combination with a genetic algorithm, to arrive at a solution. The output of such determinations would be a data file defining a suitable heat exchanger, the definition including the parameters for the unit R, and the number of R units along each of the three orthogonal axes (for example referring back to FIG. 6, it can be seen that there are four units along the fore to aft axis, and five along the bottom to top axis, with the near to far number being hidden from view).

At step 708, the heat exchanger could be formed by issuing the data file to an additive layer manufacturing station.

In certain examples a manifold, corresponding to the heat exchanger core, could be generated by the process. A data file defining such a manifold could thereby be issued to an additive manufacturing station, alongside the heat exchanger data file, to enable the entire heat exchanger to be formed.

In general, the examples given so far have been in the form of multi-layer heat exchangers. In other examples, the heat exchanger may comprise channels in the form of a tubular cluster. Within this cluster, a first group of tubes (odd tubes) would carry a first fluid, and a second group of tubes (even tubes) would carry a second fluid. A first set of conduits would provide interconnections between the odd tubes, with interconnecting conduits passing through an even tube. A second set of conduits would interconnect the even tubes, with interconnecting conduits passing through an odd tube. As a further alternative, such tubular clusters could comprise linear tubes arranged in parallel. Such tubular clusters could comprise nested spirals of tubes.

In general, the example cores given so far have been in the form of planar or substantially planar layers and channels, formed by planar base plates stacked in parallel. In alternative examples, the core may be provided by a plurality of curved channels which may be of a predetermined shape or curvature so as to be conformal with a further device. The further device could be a substantially cylindrical engine. Within such cores, channels could be substantially conformal with one another, so as to maintain an inter-plate separation.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A heat exchanger comprising:
   a first channel, for communicating between a first channel inlet and a first channel outlet;
   a second channel for communicating between a second channel inlet and a second channel outlet;
   a third channel for communicating between a third channel inlet and a third channel outlet; and
   a first conduit interconnecting the first channel and the third channel, and thereby defining a first group of interconnected channels, the first conduit extending through the second channel;
   wherein a plurality of first conduits interconnects the first channel and the third channel, the plurality of first conduits extending through the second channel;
   wherein the plurality of first conduits are arranged in adjacent pairs where one conduit per pair is arranged to promote inter-channel flow from the third channel to the first channel, and the other conduit per pair is arranged to promote inter-channel flow from the first channel to the third channel;
   a base plate defining an axis P extending perpendicularly through a centroid of said base plate, wherein said conduits are arranged such that they exhibit rotational symmetry, order 2, about said base plate axis P;
   a repeating unit (R) comprising conduit openings in said base plate;
   said repeating units defined as a mirror image of said repeating unit R, reflected in a yz plane, and rotated by 90 degrees about said base plate axis P.

2. The heat exchanger according to claim 1 wherein the first conduit is inclined relative to a central axis defined by the first channel and thereby arranged to promote inter-channel flow.

3. The heat exchanger according to claim 2 wherein the first conduit has an elongate cross-sectional form.

4. The heat exchanger according to claim 3 wherein the elongate cross-sectional form defines a shorter aspect S and a longer aspect L, wherein the longer aspect L is substantially aligned with a predetermined flow direction.

5. The heat exchanger according to claim 3 wherein the elongate cross-sectional form defines a shorter aspect S and a longer aspect L, wherein the longer aspect L is substantially aligned with the incline of the first conduit.

6. The heat exchanger according to claim 1 further comprising:
a fourth channel, for communicating between a fourth channel inlet and a fourth channel outlet; and
a second conduit interconnecting the second channel and the fourth channel and thereby defining a second group of interconnected channels, the second conduit extending through the third channel.

7. The heat exchanger according to claim 6 wherein the second conduit is inclined relative to a central axis defined by the second channel.

8. The heat exchanger according to claim 6 comprising a plurality of second conduits interconnecting the second channel and the fourth channel, each of the second conduits extending through the third channel.

9. The heat exchanger according to claim 8 wherein the plurality of second conduits are arranged in adjacent pairs where one conduit per pair is arranged to promote inter-channel flow from the fourth channel to the second, and the other conduit per pair is arranged to promote inter-channel flow from the second channel to the fourth.

10. The heat exchanger according to claim 9 wherein a first conduit pairs and the second conduit pairs occupy an equivalent position in the second and third channel respectively.

11. The heat exchanger according to claim 6 comprising a top plate and plurality of base plates mounted between a pair of side walls, wherein
the first channel is defined between the top plate, a first base plate and a portion of the side walls;
the second channel is defined between the first base plate, the second base plate and a portion of the side walls;
the third channel is defined between the second base plate, the third base plate and a portion of the side walls; and
the fourth channel is defined between the third base plate, a fourth base plate and a portion of the side walls.

12. The heat exchanger according to claim 11 wherein the first and third channels, being in fluid communication, are arranged to transport a first fluid in a first flow direction, and the second and fourth channels, being in fluid communication are arranged to transport a second fluid in a second flow direction.

13. The heat exchanger according to claim 12 further comprising, towards a first end:
a first fluid ingress manifold connecting the inlets of the first and third channels to a common first fluid inlet port, and
a second fluid ingress manifold connecting the inlets of the second and fourth channels to a common second fluid inlet port;
and towards a second end:
a first fluid egress manifold connecting the outlets of the first and third channels to a common first fluid outlet port, and
a second fluid egress manifold connecting the outlets of the second and fourth channels to a common second fluid outlet port.

14. A method of heat exchange comprising:
providing a heat exchanger according to claim 1,
causing a coolant fluid to flow through the first and second channels; and
causing a working fluid to flow through the third channel.

15. The heat exchanger according to claim 1 wherein a bore of said conduits is tapered, presenting a smaller frontal area to an other fluid flow as it extends between channels it connects, whereby a pressure drop in the other fluid channel is lowered.

16. A heat exchanger comprising:
a first channel, for communicating between a first channel inlet and a first channel outlet;
a second channel for communicating between a second channel inlet and a second channel outlet;
a third channel for communicating between a third channel inlet and a third channel outlet; and
a first conduit interconnecting the first channel and the third channel, and thereby defining a first group of interconnected channels, the first conduit extending through the second channel;
wherein said first group of interconnected channels is repeated, whereby fluids in channels are evenly mixed;
wherein said repeated first group of interconnected channels comprises a three-dimensional portion (200) configured as a plurality of repeating units (R), wherein each repeating unit comprises:
three mutually orthogonal reference axes x, y, and z, wherein the y-dimension corresponds to height, the x-dimension corresponds to width and the z-dimension corresponds to depth, each repeating unit comprising:
a rectangular base plate (216) which is parallel with the zx plane;
the base plate further comprising a pair of openings (218a, 218b);
a pair of linear conduits (208a, 208b) extending from the base plate, wherein the pair of openings and the pair of linear conduits are arranged such that their footprints are in the base plate define a rectangle;
wherein the pair of linear conduits are arranged diagonally opposite each other on the base plate;
wherein the pair of linear conduits extend from the base plate at an incline of 45 degrees with respect to the yx plane; and
wherein one of the pair of linear conduits extends at an angle of −45 degrees with respect to the yx plane and the other of the pair of linear conduits extends at an angle of +45 degrees with respect to the yx plane, such that the pair of linear conduits are arranged in rotational symmetry about an axis (P) extending perpendicularly through the centroid of the base plate.

* * * * *